United States Patent [19]

Hammond et al.

[11] 4,359,368
[45] Nov. 16, 1982

[54] DEUTERIUM EXCHANGE BETWEEN HYDROFLUOROCARBONS AND AMINES

[75] Inventors: Willis B. Hammond, Chatham, N.J.; Jacob Bigeleisen, St. James, N.Y.; Sam A. Tuccio, Morris Plains, N.J.

[73] Assignee: Allied Corporation, Morristown, N.J.

[21] Appl. No.: 124,486

[22] Filed: Feb. 25, 1980

[51] Int. Cl.³ .................. C01B 3/02; C07F 13/00
[52] U.S. Cl. ........................ 204/158 R; 423/2; 423/648 R; 423/648 A
[58] Field of Search ............ 43/2, 648 R, 648 A; 204/158 L, 158 A, 158 R

[56] References Cited

PUBLICATIONS

Streitwieser, Jr., et al., Chem. Abs. 56:15385i.

Primary Examiner—Henry R. Jiles
Assistant Examiner—Robert C. Whittenbaugh
Attorney, Agent, or Firm—James Riesenfeld; Gerhard H. Fuchs

[57] ABSTRACT

The concentration of deuterium relative to hydrogen in a hydrofluorocarbon is increased by contacting the hydrofluorocarbon, in the presence of an alkali metal amide, with an amine having a concentration of deuterium that is greater than that which provides equilibrium with the hydrofluorocarbon. In a preferred embodiment, a compound enriched in deuterium is produced by first exposing trifluoromethane to infrared laser radiation to selectively cause a chemical reaction involving deuterium-containing molecules. The deuterium-depleted trifluoromethane is deuterium replenished by exchange with an amine, and the compound enriched in deuterium is converted to heavy water. Heavy water is useful in certain types of nuclear reactors.

16 Claims, 4 Drawing Figures

DEUTERIUM EXCHANGE BETWEEN HYDROFLUOROCARBONS AND AMINES

DESCRIPTION

BACKGROUND OF THE INVENTION

1. Field of the Invention

This invention relates to chemical exchange between hydrogenous compounds, in particular to deuterium exchange between hydrofluorocarbons and amines.

2. Description of the Prior Art

As used in this specification and the appended claims, terms such as "hydrogen," "water" and "hydrofluorocarbons" designate materials which include the naturally occurring abundance of deuterium, which is generally in the range from about 0.010 to about 0.016 mole percent relative to the hydrogen content. Substantially pure (isotopically) materials are referred to in symbolic form; e.g. $H_2O$ and $D_2O$. The term "deuterium-enriched" means material whose deuterium concentration has been increased by an exchange process to a level greater than that before the exchange, regardless of whether or not the enriched material has a deuterium concentration greater than the natural abundance. Conversely, "deuterium-depleted" material has had its deuterium concentration reduced by an exchange process or other process to a concentration which may or may not be lower than the natural abundance. Also, as used in this specification and the appended claims, the term "chemical reaction" is meant to include unimolecular reactions, such as isomerization, dissociation and predissociation, in addition to more conventional chemical reactions.

Heavy water ($D_2O$) finds important use as a neutron moderator and coolant in certain atomic power reactors. These reactors are typified by the CANDU (Canadian deuterium-uranium) reactor. They have the important advantage that they do not require the use of uranium enriched in $U^{235}$ as a fuel; instead, they use lower-cost natural uranium. They do, however, require large quantities of heavy water. Typically, 850 kg of $D_2O$ are required per MW of installed electrical capacity. The $D_2O$ cost constitutes about 15% of the capital costs for the power plant. With growing worldwide interest in heavy water reactors, some estimates project $D_2O$ requirements for the atomic power industry to reach 9000 Mg per year by the turn of the century. Accordingly, low cost schemes for producing $D_2O$ are required.

At present, large-scale production of heavy water is based on the Girdler sulfide (GS) process, which involves an isotopic exchange process between hydrogen sulfide ($H_2S$) and water. The overall exchange mechanism can be described by the dual temperature reaction:

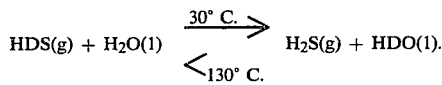

Using this technology, an enrichment factor, $\beta$, defined as the ratio of the concentration of deuterium in the product to its concentration in the feed material, an effective value of 1.3 is obtained in a single elemental stage of enrichment. After multiple enrichment stages, the final deuterium content in the water using this exchange technique is on the order of 20%. Further deuterium enrichment to the required 99.75 atom percent D is conveniently done by water distillation. The requirement of hundreds of separative elements, coupled with the low D/H ratio in natural water ($\sim 1.5 \times 10^{-4}$), make it necessary to process nearly 40 000 moles of feed material for each mole of product. This makes GS heavy water plants both highly capital intensive and highly energy intensive.

In addition to the GS process, three other chemical exchange processes have been commercialized; namely, water-hydrogen, ammonia-hydrogen, and methylamine-hydrogen. Although each of these processes requires less energy and has a higher single-stage deuterium enrichment factory than the GS process, the latter process is preferred for large-scale operations. The distillation of water and of hydrogen have also been used commercially for heavy water production, but only the latter is economically competitive with the GS process, and then only for small-scale operations. A number of other processes for the production of heavy water have been investigated. These include water electrolysis, combined electrolysis and catalytic exchange, hydrogen adsorption on palladium, methane-hydrogen exchange, hydrogen diffusion, and water crystallization. At present, none of these processes appears to be economically competitive with the GS process.

Laser isotope separation (LIS) provides the basis for additional techniques for $D_2O$ production. In some cases, LIS techniques provide much higher single-stage enrichment factors than does the GS process. Marling and Herman reported the dissociation of $CF_3CHCl_2$ (refrigerant 123) using infrared radiation from a $CO_2$ laser with 1400-fold enrichment of deuterium concentration in a single step (Appl. Phys. Lett. 34, 439 (1979)). However, this process was later found to be impractical for commercialization. In particular, the infrared absorption ratio for deuterium vs hydrogen containing molecules is only about 100:1. Hence, when natural $CF_3CHCl_2$ is irradiated, about 98% of the laser energy is absorbed by hydrogen-containing molecules and converted to heat.

Another LIS process that is useful as a step in $D_2O$ production involves isotope-selective dissociation of gaseous trifluoromethane (TFM). Natural TFM, containing about 0.015% $CF_3D$, is irradiated with a $CO_2$ laser at an appropriate infrared frequency (for example, $975 \pm 50$ cm$^{-1}$). The $CF_3D$ absorbs the radiation and dissociates according to $$CF_3D + nh\nu \rightarrow :CF_2 + DF$$

followed by $$2:CF_2 \rightarrow C_2F_4.$$

$CF_3H$ absorbs negligible radiation and undergoes little dissociation. The DF product is separated from the remaining gas by conventional chemical methods, such as reaction with a metal oxide. Single-step enrichment factors of about $10^4$ have been demonstrated with this process.

There are several advantages of the TFM deuterium enrichment process over the currently used commercial processes. The extremely high enrichment factor allows a considerable reduction in the volumes of materials being handled in a separation plant at one time, which greatly reduces capital requirements and energy consumption. In the LIS process, nearly all the deuterium can be stripped from the feed material, but in the GS process, thermodynamic restrictions limit the deuterium extraction to 21%. Furthermore, in the GS process, the $H_2S$ working medium is highly toxic, whereas TFM is essentially non-toxic. In the methylamine-hydrogen exchange process, the thermodynamic limitation on $D_2$ extraction is 55%.

Additional details of the process for isotope separation by selective dissociation of TFM with an infrared laser are provided in copending U.S. application Ser. No. 25 978, filed Apr. 2, 1979. The disclosure of said copending application is incorporated herein by reference. To use the process therein disclosed in a commercial heavy water production process, it is essential that the TFM be continuously recycled and its deuterium content replenished through chemical exchange with a protolytic solvent. In view of the low naturally occurring D/H ratio, the deuterium for replenishment must ultimately be derived from an inexpensive feedstock available in large quantities, such as water, hydrogen or ammonia. This requirement does not restrict the exchange medium used to replenish TFM to one of these materials, however, since an exchange medium can, in turn, be deuterium replenished from one of these inexpensive feedstocks.

A process for deuterium replenishment of TFM has been demonstrated by Andreades; namely, the exchange of TFM and methanol-OD, catalyzed by the base sodium methoxide. The exchange rate is too slow, however, to be practical for the present purpose. (J. Am. Chem. Soc. 86, 2003 (1964)).

SUMMARY

In accordance with the present invention, a process for increasing the concentration of deuterium relative to hydrogen in a hydrofluorocarbon comprises contacting the hydrofluorocarbon in the presence of an alkali metal amide with an amine having a concentration of deuterium at least that which will yield an increase in deuterium concentration of the hydrofluorocarbon upon equilibration. The alkali metal amide catalyzes exchange between the amine hydrogens and the hydrofluorocarbon hydrogens.

This process may be part of a process for obtaining a compound enriched in deuterium. Said process comprises the known method of:

(a) exposing a gaseous hydrofluorocarbon to infrared laser radiation of a predetermined frequency to selectively cause a chemical reaction involving hydrofluorocarbon molecules containing deuterium without substantially affecting hydrofluorocarbon molecules not containing deuterium, thereby producing, as reaction products, a compound enriched in deuterium and hydrofluorocarbon depleted in deuterium; combined with a new method, which comprises:

(b) enriching the deuterium content of the depleted hydrofluorocarbon by contacting the depleted hydrofluorocarbon with an alkali metal amide and an amine having a concentration of deuterium at least that which will yield an increase in deuterium concentration of the hydrofluorocarbon upon equilibration, whereby the amine becomes depleted in deuterium.

The deuterium enriched compound produced in step (a) can be converted to heavy water ($D_2O$) by well-known methods. The deuterium enriched hydrofluorocarbon produced in step (b) returns to step (a) to close the cycle. Using well-known technology, the depleted amine from step (b) may be deuterium enriched by exchange with a natural deuterium source such as hydrogen or water.

By providing an efficient process for replenishing a deuterium-depleted hydrofluorocarbon, particularly TFM, the present invention enables one to realize the advantages of the LIS method for obtaining a deuterium enriched compound over the prior art GS method. As indicated above, these advantages include considerable reductions in process costs, energy requirements and potential toxicity problems.

BRIEF DESCRIPTION OF THE DRAWINGS

The drawings are schematic flow diagrams depicting processes for preparing a compound enriched in deuterium by the present invention.

DETAILED DESCRIPTION OF THE INVENTION

Figure 1:
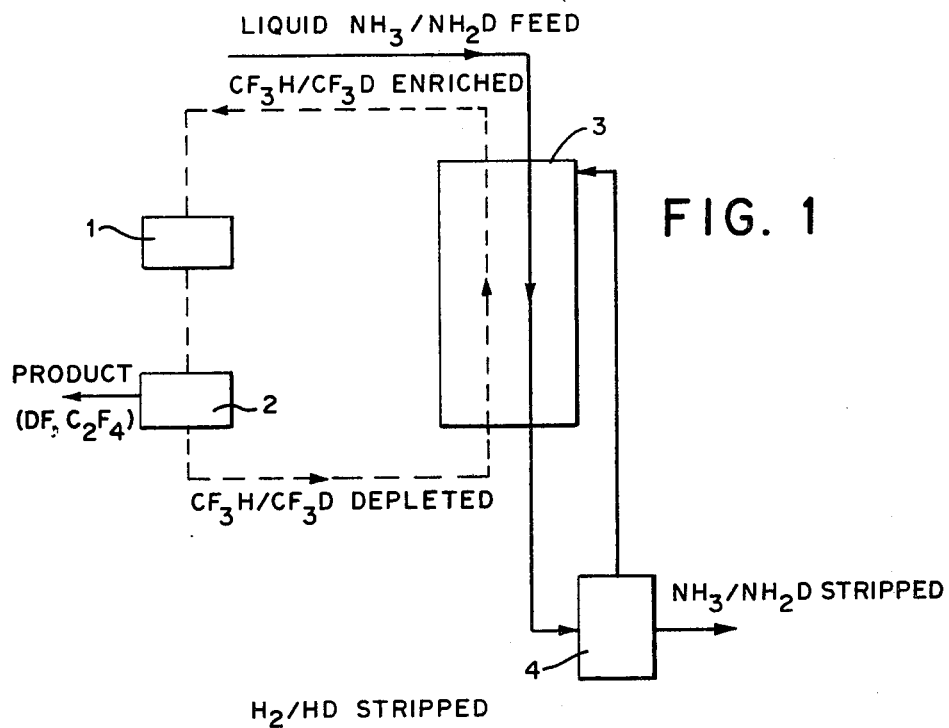
FIG. 1 shows a process in which photolyzed TFM is deuterium enriched by exchange with liquid ammonia.

The present invention comprises a process for increasing the concentration of deuterium relative to hydrogen (D/H ratio) in a hydrofluorocarbon by chemical exchange with an amine in the presence of an alkali metal amine. The chemical exchange can be described by the equation:

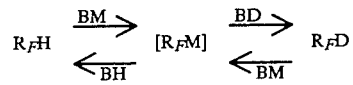

where BH is an amine used in a conventional chemical exchange and BM is the alkali metal salt of the amine. $R_FH$ is a hydrofluorocarbon and $R_FD$ is the deuterium-enriched form of the hydrofluorocarbon. $R_FM$ has only a transient existence in the exchange process.

As used in this specification and the appended claims, hydrofluorocarbons denote compounds which include at least one atom each of hydrogen, fluorine and carbon and optionally contain one or more atoms of chlorine or bromine. Aliphatic hydrofluorocarbons having two or fewer carbon atoms are preferred. Examples of suitable hydrofluorocarbons and their refrigerant numbers are:

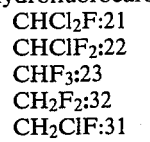

and either or any of the isomers of:

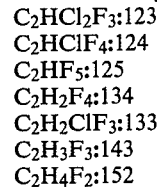

Among these hydrofluorocarbons, those of the formula $HCF_2X$, wherein X is F, $CF_3$, $CHF_2$, $CH_2F$ or $CH_3$, are more preferred, with trifluoromethane (TFM) most preferred for reasons discussed below.

By the process of this invention, a hydrofluorocarbon, for example gaseous TFM, may be replenished by cocurrent or countercurrent exchange with a solution of alkali metal amide in liquid ammonia or other aliphatic or alicyclic amine. The exchange is accomplished using standard gas-liquid contacting equipment, such as bubble-cap apparatus, sieve plates, packed columns or the like. If liquid ammonia is used at room temperature, the TFM must be compressed to bring it to the necessary pressure (2–3 MPa) for pumping through the ammonia; then, later, the TFM must be expanded again to near atmospheric pressure or below before being excited with the laser. Other aliphatic or alicyclic amines, preferably methylamine or cyclohexylamine, are preferred over ammonia because of their lower vapor pressure, which simplifies separating the hydrofluorocarbon from the amine following exchange. If the amine is to be deuterium replenished by exchange with water, it should have low water solubility to facilitate separation after exchange. Thus, the use of a low vapor pressure amine with low solubility in water significantly reduces the total energy required to deuterium enrich the hydrofluorocarbon. On the other hand, low vapor pressure requires the use of higher distillation temperatures for separating the amine from the alkali metal salt. Primary amines have the advantage (over secondary and tertiary amines) that more exchangeable hydrogens are available. A mixture of amines may be preferred over a single amine. For example, the hydrogen-amine exchange rate may be increased significantly if small amounts of trimethylamine are added to monomethylamine. These factors must all be balanced in selecting an amine.

The alkali metal salt, i.e. the metal amide used in the exchange process, serves to catalyze the exchange. The rate of exchange depends on both the amine and the metal salt. Catalytic activity requires that the metal amide be soluble in the amine. Generally, the solubility of the alkali metal salt in amines is $Cs > K > Na > Li$ and the same order is observed for rate of catalysis. However, cost considerations may require a tradeoff.

In a preferred embodiment of this invention, the above-described exchange process is part of a process for obtaining a compound enriched in deuterium, which comprises:

isotope-selective infrared laser excitation of TFM to produce a dissociation product enriched in deuterium and deuterium-depleted TFM and replenishment of deuterium in depleted TFM by the above-described chemical exchange between TFM and an amine.

The laser excitation step, as noted above, is disclosed in detail in copending U.S. Application Ser. No. 25 978, filed Apr. 2, 1979. That step yields deuterium fluoride (DF), tetrafluoroethylene ($C_2F_4$) and TFM depleted in deuterium. DF may be collected by a number of known chemical techniques; for example, complex formation with an alkali fluoride or a Lewis base. Later, DF recovery is achieved by heating the complex. For heavy water production, DF is converted to $D_2O$ by well-known methods, such as reaction with metal oxide to form the metal fluoride, $D_2O$ and HDO. The $D_2O$ and HDO remain adsorbed on the metal oxide surface and can be removed by heating. The $C_2F_4$ is a stable and valuable by-product, but it should not be allowed to build up to significant concentrations. It tends to polymerize and coat photolysis chamber windows, foul moving parts and plug adsorbents. One of the methods of $C_2F_4$ extraction is chlorination of the $C_2F_4$ to $C_2Cl_2F_4$ and extraction by condensation. Small amounts of TFM must be added during the process to make up for the DF and $C_2F_4$ removed.

As discussed above, deuterium-depleted TFM may be replenished by chemical exchange with liquid ammonia. A practical heavy water production facility would then require a large source of ammonia. For reasons discussed above, exchange with aliphatic or alicyclic amines, for example methylamine or cyclohexylamine, is preferred. In that case, a practical system would require that the amine as well as the TFM be recycled. The deuterium-depleted amine may be replenished by exchange with hydrogen or water by known techniques. (See, for example, E. A. Symons et al., J. Am. Chem. Soc. 101, 6704 (1979)). A large-scale heavy water production facility would then require a large source of hydrogen or water. Hydrogen and hydrogen-nitrogen mixtures are available from synthetic ammonia plants, which use natural gas as their primary source. Hydrogen-carbon monoxide mixtures derived from coal gas synthesis plants are another potential source of hydrogen.

FIG. 1 shows a schematic flow diagram of a process for obtaining a compound enriched in deuterium. The deuterium source is liquid ammonia. TFM vapor is laser irradiated in a photolysis chamber 1 and then separated from the DF and $C_2F_4$ products in separator 2. After product removal, the deuterium-depleted TFM is compressed and cycled through the liquid ammonia with amide catalyst in exchange column 3 for deuterium replenishment. The isotopic fractionation factor for this exchange is estimated to be near unity. Amide catalyst and TFM are removed from the deuterium-depleted ammonia in concentrator 4, and amide catalyst concentrated in liquid ammonia is recirculated to the top of exchange column 3. This system appears to have two practical drawbacks. The first is the high cost of continual compression of the TFM to bring it to the 2–3 MPa pressure necessary to pump it through the liquid ammonia at room temperature. The second objection is possible contamination of the ammonia with amide and/or TFM, which would seriously affect the resale value of the ammonia.

A process for stripping deuterium from hydrogen gas using an amine has been commercialized in Canada (W. P. Wynn, "AECL-Sulzer Amine Process for Heavy Water" in *Separation of Hydrogen Isotopes*, edited by H. K. Rae, ACS Symposium Series, Vol. 68 (1978)). The isotopic fractionation factor is about 4.1 at room temperature, with the deuterium concentrating in the amine. As a result, the deuterium concentration in the amine is about 0.05% when it is in equilibrium with hydrogen gas of natural isotopic abundance.

Figure 2:
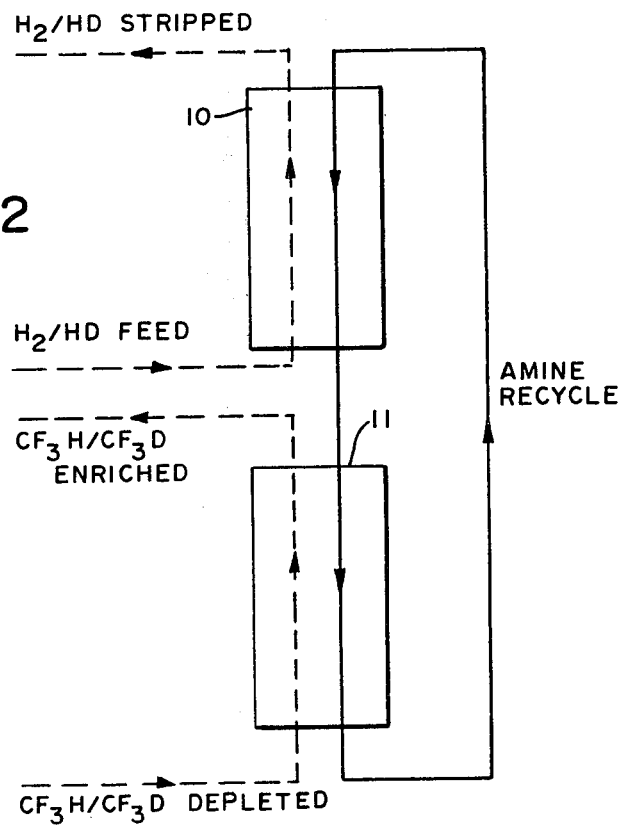
FIG. 2 shows a process in which gaseous hydrogen provides deuterium to photolyzed TFM through an intermediate amine.

FIG. 2 shows a schematic flow diagram of an embodiment of the present invention that utilizes hydrogen gas as the source of deuterium. The system shown there consists of two countercurrent towers, a feedstock stripper 10 and a TFM reenricher 11. The feedstock stripper 10 strips HD from the hydrogen source through chemical exchange with an aliphatic or alicyclic amine. TFM reenricher 11 transfers deuterium from the amine to TFM. Since the isotopic fractionation factor in the TFM/amine exchange is about unity, the CF$_3$D concentration fed to the photolytic chamber is about 0.05%. After isotope-selective laser excitation and reaction, the products are separated and the depleted TFM returns to the TFM reenricher 11. The amine with base catalyst exiting from the TFM reenricher is returned to the top of the feedstock stripper 10. Separation of the amine from hydrogen is easily accomplished by absorption, adsorption or compression techniques or by other methods well known in the art. Separation of the amine from the TFM is simplified if the amine is non-volatile. The amine is under complete recycle in this feed stage and serves to transfer deuterium from the hydrogen feed to the TFM.

Figure 3:
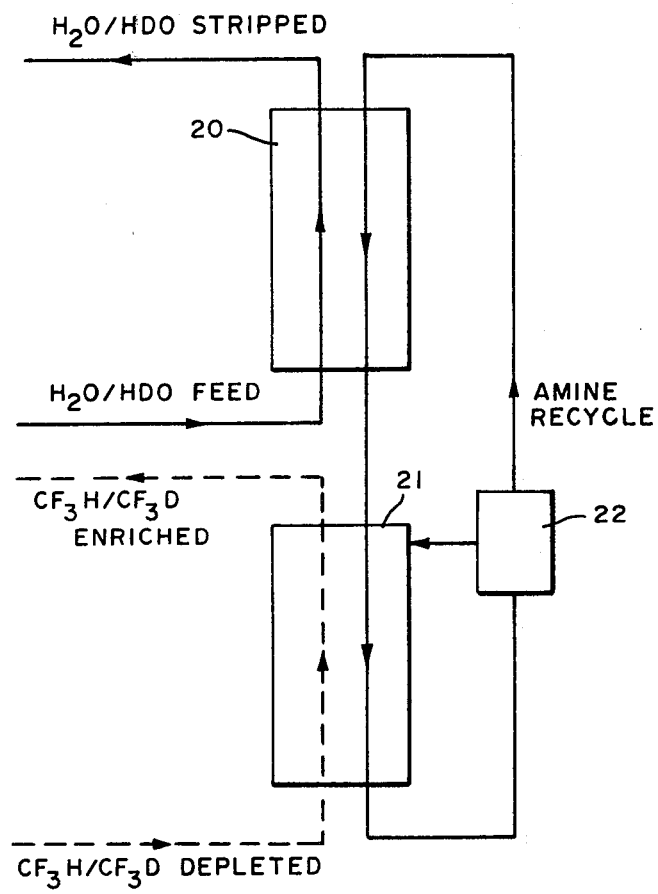
FIG. 3 shows a process in which water provides deuterium to photolyzed TFM through an intermediate amine.

The flow diagram of FIG. 3 shows another embodiment of the present invention wherein water provides deuterium to replenish TFM. Deuterium is stripped from the water in an acid or base catalyzed exchange with an amine in water feed stripper 20. The amine, in turn, enriches TFM in TFM reenricher 21. The metal salt catalyst used in the amine/TFM exchange must be removed before the water/amine exchange, because the catalyst is easily hydrolyzed. For the same reason, the amine must be separated from the water and dried after replenishment. The catalyst is removed in concentrator 22 and returned to the top of TFM reenricher 21.

Figure 4:
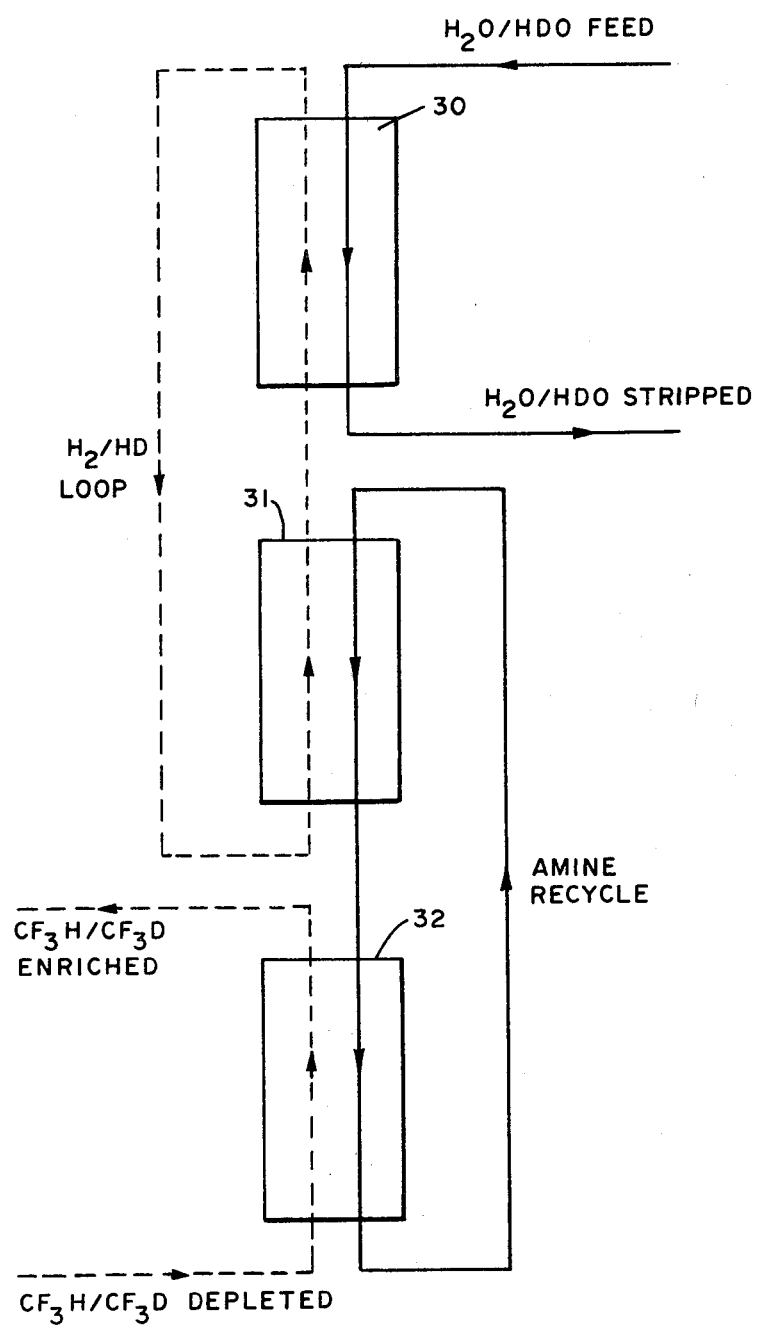
FIG. 4 shows a process in which water provides deuterium to gaseous hydrogen, which in turn provides deuterium to photolyzed TFM through an intermediate amine.

FIG. 4 shows an embodiment of the present invention wherein a combustion of water and hydrogen is used to replenish the amine. In this embodiment, hydrogen gas is deuterium enriched by contact with water feed in a feedstock stripper column 30. This column can be either a steam-hydrogen transfer column or a heterogeneous catalystic exchange column that uses a non-wetting catayst suspended in liquid water. The deuterium-enriched hydrogen is contacted with deuterium-depleted amine in transfer column 31. Deuterium-enriched amine and deuterium-depleted TFM are contacted in TFM reenricher 32.

This invention is more fully illustrated by the following examples. The specific techniques, conditions, materials and reported data set forth are exemplary and should not be construed as limiting the scope of the invention.

EXAMPLE 1

To test deuterium exchange between TFM and liquid ammonia, several exchange reactions were run between TFM-d and natural ammonia. The TFM-d was obtained from Merck, Sharp, and Dohme of Canada and contained 98.0% CF$_3$D, 1.1% CF$_3$H, and 0.9% C$_2$F$_4$. The ammonia was obtained from Matheson Gas Products and was 99.99% pure. The deuterium exchange reactions in these experiments and in some of the other examples are in the reverse direction to that which would normally be encountered in applications to heavy water production; i.e., deuterium is transferred from the TFM to the amine. The reaction mechanisms are chemically equivalent, except that the direction of deuterium transfer is dependent on starting concentrations. TFM-d was used as a matter of convenience and to make easier the analysis of the reaction products.

In each of the runs in this example, a mixture of TFM-d and ammonia was frozen on top of a sample of potassium amide salt in a 21 cm$^3$ volume, glass reaction vial. Liquid nitrogen (LN$_2$) at $-196°$ C. was placed around the reaction vial to condense the gases. The LN$_2$ was then removed and replaced by a chloroform slush bath at $-63°$ C. At this temperature, ammonia is liquid, whereas TFM-d is still gaseous. In run 6, the liquid ammonia was held at $-35°$ C. using an ethylene dichloride slush bath, but the other conditions were the same as in runs 1–5. In each run, the mixture was allowed to stand for a fixed amount of time and then returned to room temperature, thereby re-gasifying the ammonia. The TFM and ammonia gases were then examined on a mass spectrometer. The conversion of CF$_3$D to CF$_3$H was determined from the relative amplitudes of the CF$_2$H+ ion (amu 51) and the CF$_2$D+ ion (amu 52). The results are given in Table I. It should be noted that the deuterium exchange rate in these experiments was severely limited by the diffusion rate of the TFM through the liquid ammonia surface.

TABLE I

| Run # | Liquid NH$_3$ (mg) | TFM—d (mg) | KNH$_2$ (mg) | Reaction Time (min.) | H/D Ratio | % of Equilibrium Exchange |
|---|---|---|---|---|---|---|
| | Initial TFM—d | | | | 0.011 | |
| 1 | 159 | 68 | 23 | 30 | 2.06 | 7% |
| 2 | 80 | 17 | 28 | 30 | 14.2 | 22% |
| 3 | 80 | 17 | 13 | 60 | 7.57 | 12% |
| 4 | 508 | 105 | 9.5 | 30 | 0.659 | 1.1% |
| 5 | 828 | 161 | 12.5 | 30 | 0.398 | 0.6% |
| 6($-35°$ C.) | 390 | 80 | 10 | 30 | 0.815 | 1.3% |

EXAMPLE 2

A deuterium exchange reaction was run between TFM-d and nautral cyclohexylamine (CHA). The CHA was initially dried using CaH pellets. Enough potassium amide was added to the CHA to make a concentration of potassium cyclohexylamide (KCHA) adequate for deuterium exchange. The anticipated reaction is:

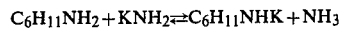

$$C_6H_{11}NH_2 + KNH_2 \rightleftharpoons C_6H_{11}NHK + NH_3$$

Although the reverse reaction is more favorable, sufficient KCHA was formed to catalyze the deuterium exchange reaction. Approximately 2 ml of the CHA solution was placed in a 23 cm$^3$ reaction vial. A 66.3 mg sample of TFM-d gas was condensed onto the CHA using LN$_2$ and then the reaction vial was brought back to room temperature. The vapor pressure of the TFM-d in the vial was approximately 101 kPa (1 atmosphere). The vial was shaken for five minutes and then allowed to stand for 25 minutes. The TFM was then separated from the CHA cryogenically and examined on a mass spectrometer. The ratio of CF$_3$H to CF$_3$D was 0.121, representing a deuterium exchange of 9.8%.

EXAMPLE 3

Further exchange experiments were run between TFM-d and CHA. For these experiments, the KCHA was prepared by reacting CHA with KH. 0.4 mg samples of TFM-d were bubbled through a 2 cm height of CHA/KCHA solution using a He carrier gas. The TFM-d/He gas bubbles were 0.7±0.4 mm in diameter and their contact time with the amine solution was 0.1 to b 0.2 second. The TFM-d samples were collected cryogenically and examined on a mass spectrometer. Table II gives the results of these experiments.

TABLE II

| Run # | KCHA Conc. (mol/L) | H/D |
|---|---|---|
| 1 | 0.0067 | 1.08 |
| 2 | 0.0022 | 0.724 |

EXAMPLE 4

A deuterium exchange reaction was run between natural TFM and CHA-$d_2$ ($C_6H_{11}ND_2$) using the same procedure as in Example 3. The CHA-$d_2$ was initially prepared by chemical exchange of natural CHA with $D_2O$. The deuterium content of the amine radical ($ND_2$) in the prepared sample of CHA-$d_2$ was 94.7 atom %. A 4.9 mg sample of natural TFM was bubbled through a 5 cm height of a 0.04 molar solution of KCHA in CHA-$d_2$. Mass spectrum analysis of the collected TFM showed a 38% conversion of $CF_3H$ to $CF_3D$.

EXAMPLE 5

In this example, deuterium exchange was made between TFM-d amd a 0.06 molar solution of potassium methylamide (KMA) in liquid monomethylamine (MMA) at −73° C. The solution was initially prepared by reacting potassium metal with liquid MMA at room temperature in a high pressure vessel. The vessel was then submerged in a trichloroethylene slush bath and a 0.71 mg sample of TFM-d was bubbled through a 5 cm height of the solution using a helium carrier gas, Analysis of the collected TFM-d showed a 77% conversion of $CF_3D$ to $CF_3H$.

We claim:

1. A process for increasing the concentration of deuterium relative to hydrogen in a hydrofluorocarbon, which comprises contacting the hydrofluorocarbon in the presence of an alkali metal amide with an amine having a concentration of deuterium at least that which will yield an increase in deuterium concentration of the hydrofluorocarbon upon equilibration.

2. The process of claim 1 wherein the hydrofluorocarbon is an aliphatic hydrofluorocarbon having two or fewer carbon atoms.

3. The process of claim 2 wherein the hydrofluorocarbon is of the formula $HCF_2X$, wherein X is F, $CF_3$, $CHF_2$, $CF_2F$ or $CH_3$.

4. The process of claim 3 wherein the hydrofluorocarbon is trifluoromethane.

5. The process of claim 1 wherein the amine is selected from the group consisting of ammonia, aliphatic amines and alicyclic amines.

6. The process of claim 5 wherein the amine is methylamine.

7. The process of claim 5 wherein the amine is cyclohexylamine.

8. A process for obtaining a compound enriched in deuterium which comprises the known method of:
(a) exposing a gaseous hydrofluorocarbon to infrared laser radiation of a predetermined frequency to selectively cause a chemical reaction involving hydrofluorocarbon molecules containing deuterium without substantially affecting hydrofluorocarbon molecules not containing deuterium, thereby producing, as reaction products, a compound enriched in deuterium and hydrofluorocarbon depleted in deuterium; combined with a new method, which comprises:
(b) enriching the deuterium content of the depleted hydrofluorocarbon by contacting the depleted hydrofluorocarbon with an alkali metal amide and an amine having a concentration of deuterium at least that which will yield an increase in deuterium concentration of the hydrofluorocarbon upon equilibration, whereby the amine becomes depleted in deuterium.

9. The process of claim 8 wherein the hydrofluorocarbon is trifluoromethane.

10. The process of claim 8 wherein the amine is liquid ammonia.

11. The process of claim 8 further comprising replenishing the deuterium content of the depleted amine by contacting the depleted amine with a deuterium source selected from the group consisting of hydrogen and water, whereby the deuterium source becomes depleted in deuterium.

12. The process of claim 11 wherein the amine is an aliphatic or alicyclic amine.

13. The process of claim 12 wherein the amine is methylamine.

14. The process of claim 12 wherein the amine is cyclohexylamine.

15. The process of claim 11 wherein the deuterium source contacting the depleted amine is hydrogen.

16. The process of claim 15 further comprising replenishing the deuterium content of the depleted hydrogen by contacting the depleted hydrogen with water.

* * * * *